Aug. 26, 1924.

J. B. STRAUSS 1,506,277

MILITARY RECONNOITERING APPARATUS

Original Filed Oct. 29, 1915   5 Sheets-Sheet 1

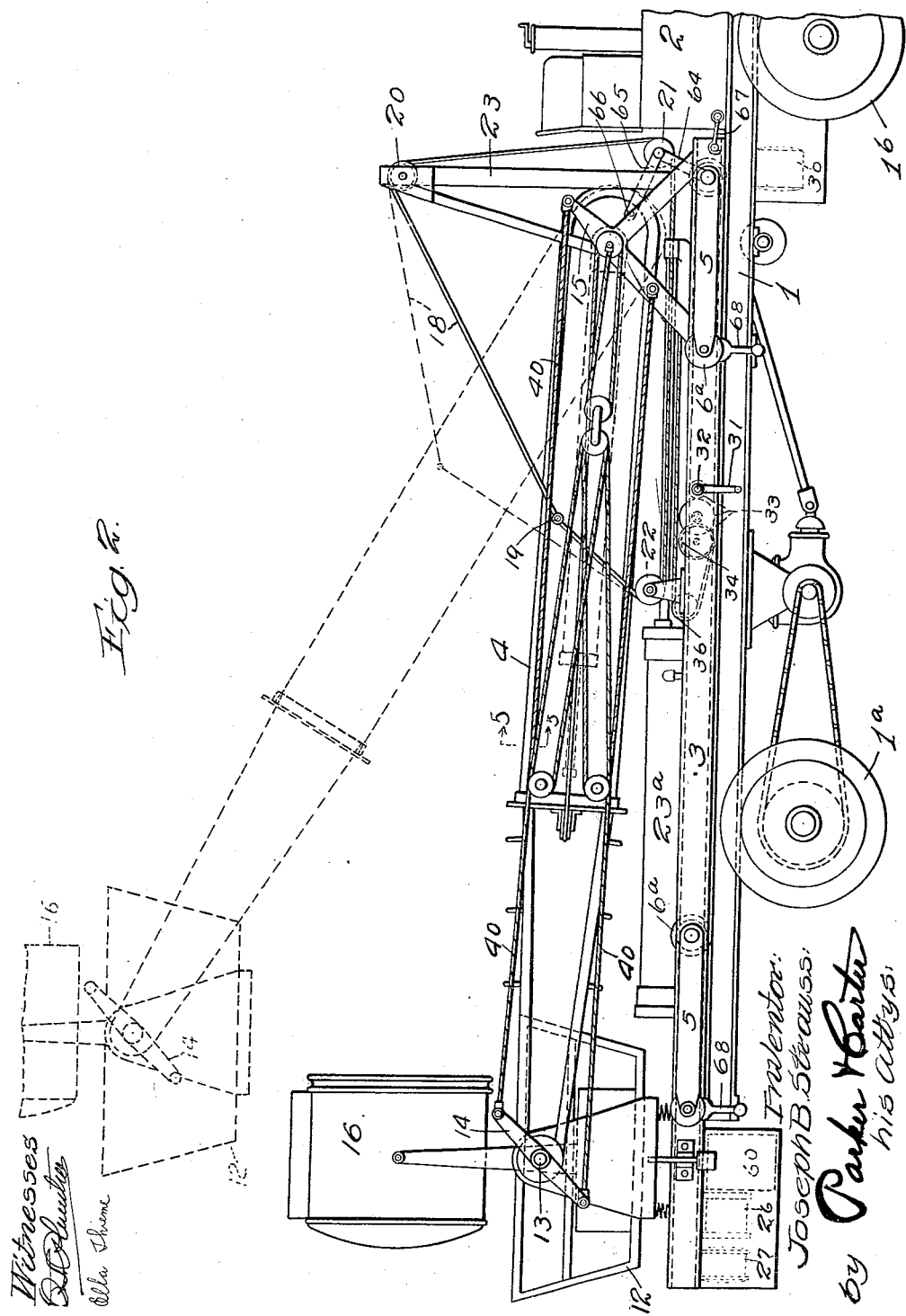

Aug. 26, 1924.
J. B. STRAUSS
1,506,277
MILITARY RECONNOITERING APPARATUS
Original Filed Oct. 29, 1915    5 Sheets-Sheet 3
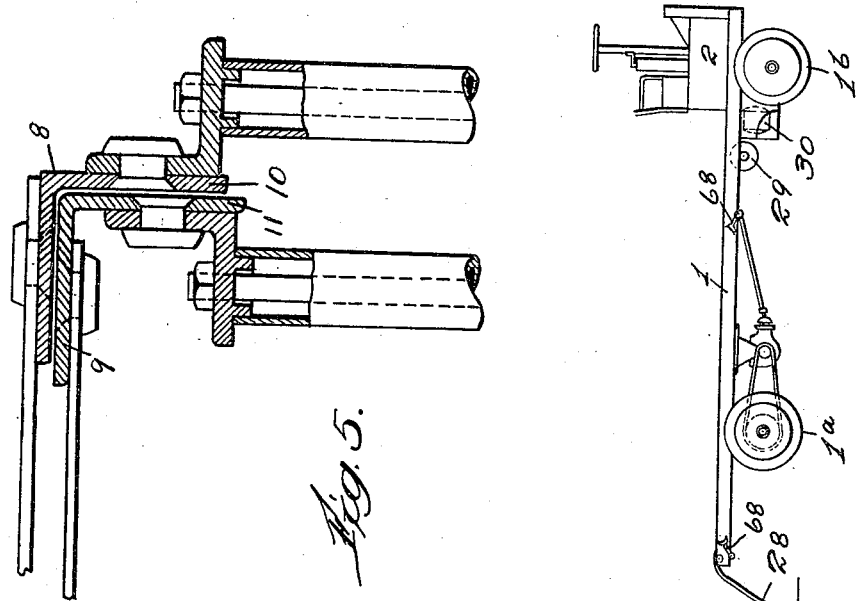
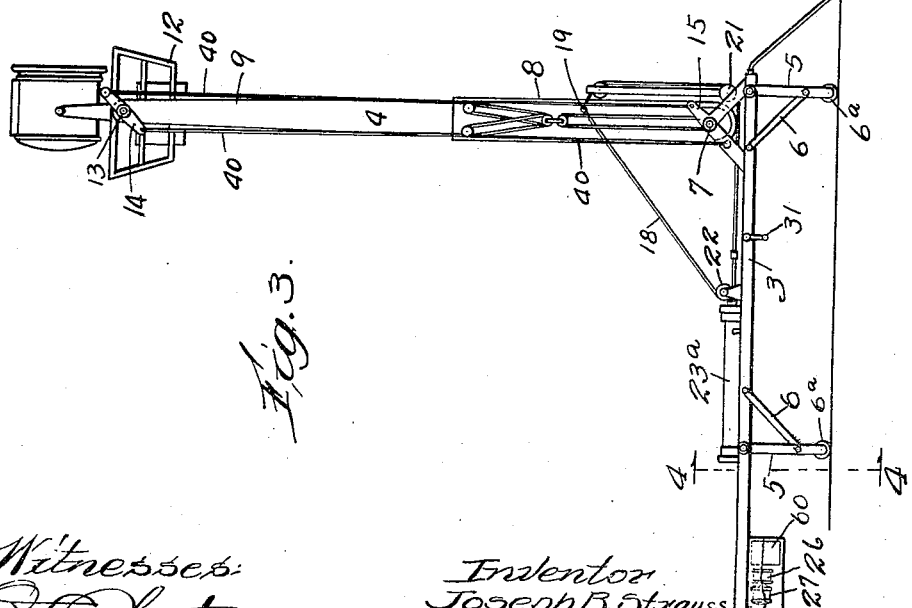

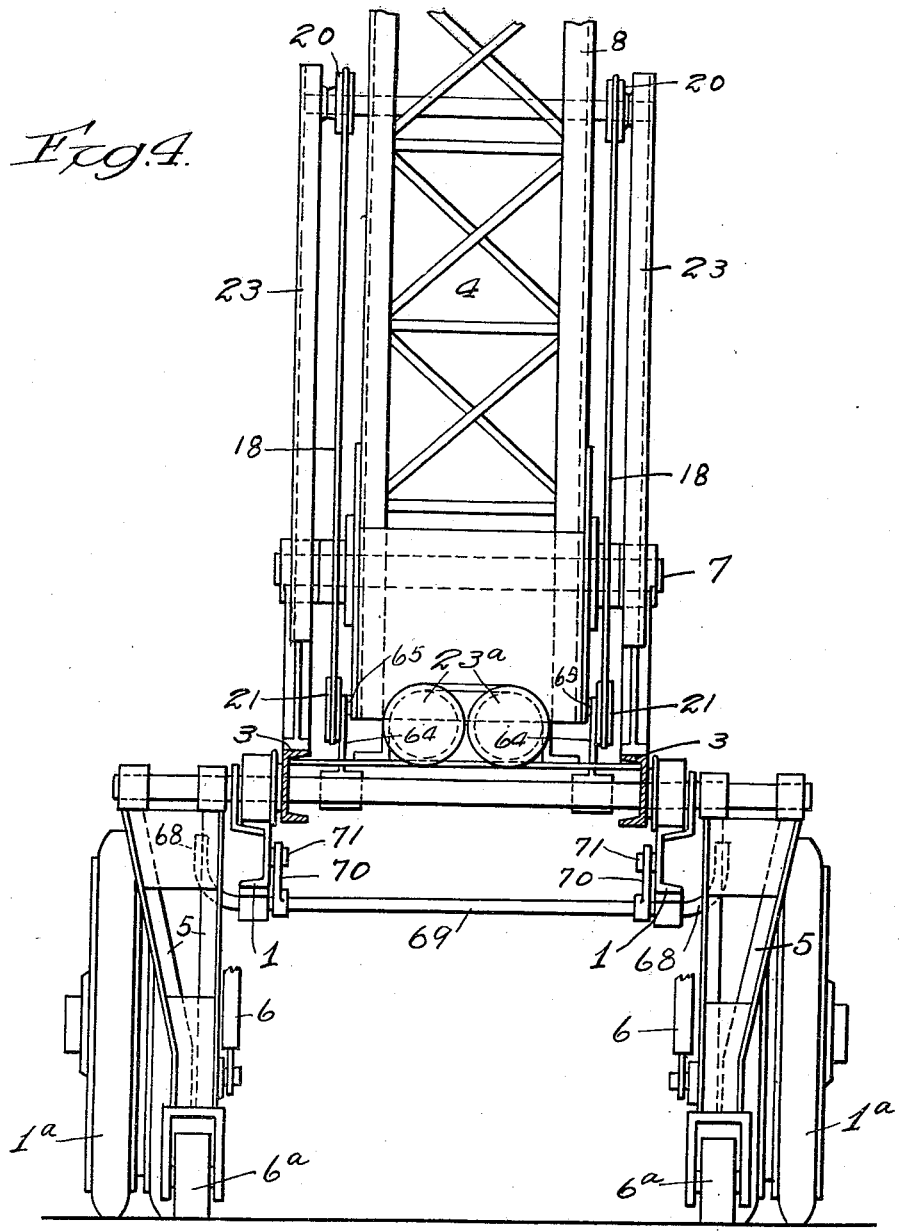

Aug. 26, 1924.
J. B. STRAUSS
1,506,277
MILITARY RECONNOITERING APPARATUS
Original Filed Oct. 29, 1915  5 Sheets-Sheet 5
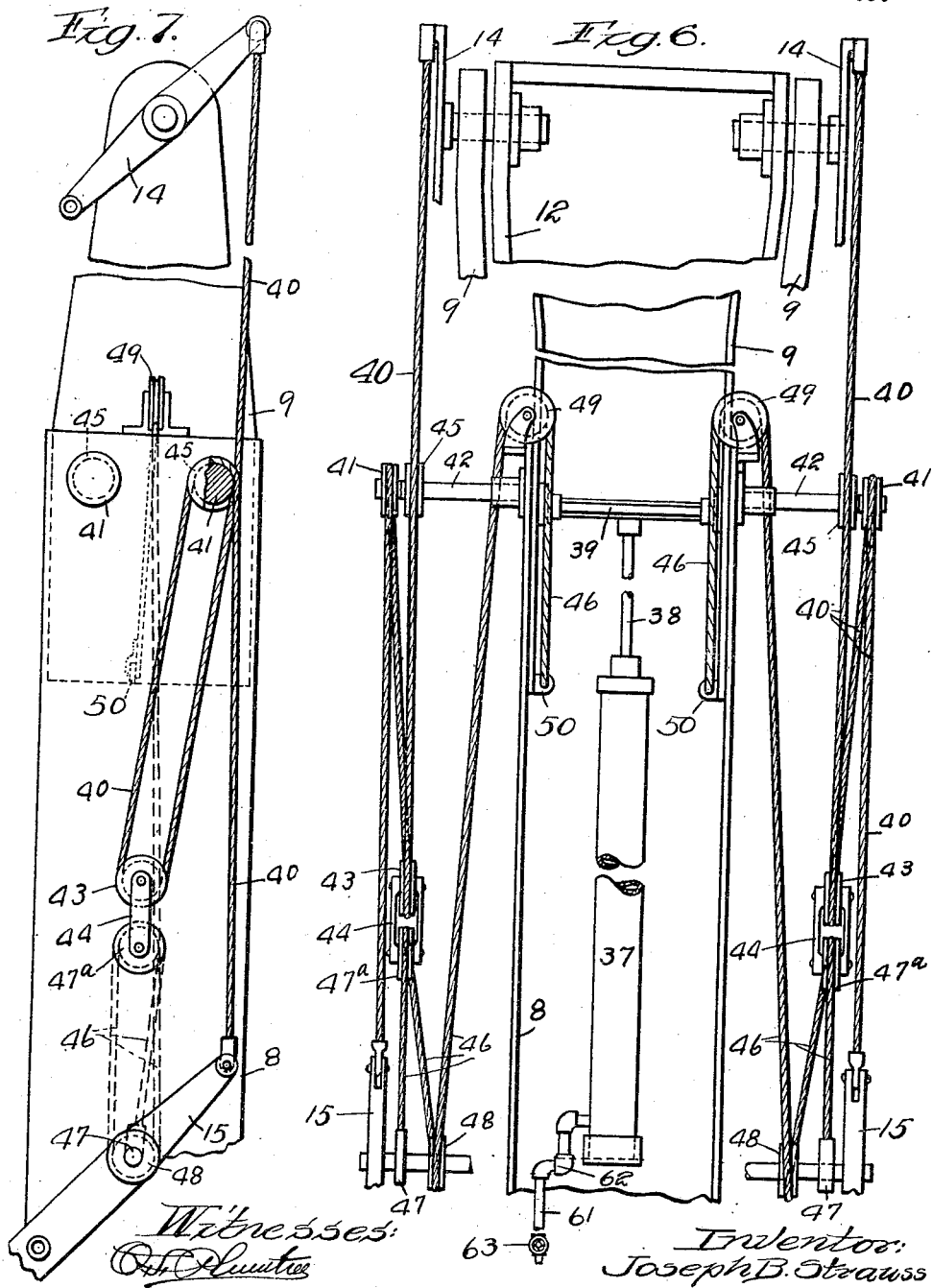

Patented Aug. 26, 1924.

1,506,277

UNITED STATES PATENT OFFICE.

JOSEPH B. STRAUSS, OF CHICAGO, ILLINOIS.

MILITARY RECONNOITERING APPARATUS.

Application filed October 29, 1915, Serial No. 58,647. Renewed June 6, 1921. Serial No. 475,553.

*To all whom it may concern:*

Be it known that I, JOSEPH B. STRAUSS, a citizen of the United States, residing at Chicago, in the county of Cook and State of Illinois, have invented a certain new and useful Improvement in Military Reconnoitering Apparatus, of which the following is a specification.

This invention relates to military reconnoitering apparatus and has for its object to provide a new and improved apparatus of this description which can be easily and quickly transported to the point of use, and can then be quickly moved to its operative position and used.

The invention is illustrated in the accompanying drawings, wherein—

Figure 1 is a view showing one form of device embodying the invention;

Figure 2 is an enlarged view showing in detail a portion of the device shown in Fig. 1, consisting of the observation tower located on the transporting truck;

Figure 3 is a view in diagrammatic form, showing the observation tower of Fig. 2, demounted from the truck;

Figure 4 is a sectional view taken on line 4—4 of Fig. 3;

Figure 5 is a sectional view taken on line 5—5 of Fig. 2;

Figure 6 is a view with parts broken away, showing the cable connections between the two sections of the tower and between the platform and the arms at the bottom of the tower;

Figure 7 is a view showing one of each of these cables as seen when the tower is in a position at right angles to that shown in Fig. 6;

Figure 8 is a view in part section showing one form of power device for controlling the observation tower.

Like numerals refer to like parts throughout the several figures.

Referring now to Fig. 1, I have shown a truck 1, which may be of any desired construction, and which may be adapted to run on ordinary roads, or on rails. This truck is driven by a suitable motor, preferably an automobile internal combustion engine 2, the engine being connected with the driving wheels of the truck so as to drive them, there being provided the controlling apparatus for the motor usually used in connection with automobile trucks. Mounted upon the truck 1 is a demountable frame 3 carrying an extensible tower 4 pivoted to the frame. The frame 3 has the folding legs or supports 5, which are folded when the frame is on the truck but which are moved to their operative positions, as shown in Fig. 3, when the tower is used separate from the truck. When in this position, the supports are held in position by the braces 6. The wheels 6ª permit the frame 3 to be used as a trailer which can be pulled along by the truck. In the construction shown, the tower is pivoted at 7 to a portion of the frame 3, and is made up of two sections 8 and 9 slidably connected together. These two sections are provided at their corners with the angle pieces 10 and 11, which slide one upon the other when the two sections of the tower are moved relatively. Pivotally connected with the upper end of the tower is a platform, the platform being pivotally or rotatably connected with the tower at 13. Means are provided for keeping this platform in a horizontal position during all the various positions of the tower. This result is secured by means of the arms 14 connected with the platform, in this particular instance with the trunnion or pivot 13 and the arms 15 connected with the frame 3. The ends of these arms are connected by connecting devices 40. There are preferably two sets of arms 14 and 15, one set on one side and the other set on the other side of the tower. In the construction shown, these arms are connected together by cables, which automatically adjust themselves when the tower is lengthened or shortened, by moving the two members relatively, as will be hereinafter more fully explained. The platform 12 may be used for any desired purpose. In the construction shown, a search-light 16 is connected with this platform so as to be held in its proper position throughout all the various positions of the tower. Some suitable mechanism is provided for moving the tower from its lowered position to its raised position and back again to its lowered position. In the construction herein shown, I provide a cable 18 at each side of the tower. The ends of the cable are connected to the tower at the points 19. The cable passes around pulleys 20, 21 and 22. The pulley 20 is preferably connected with an upright 23 connected with the frame 3. It will be seen that by moving these cables the tower may be moved to and from its raised position. In the construction shown, the cables are moved by a hydraulic mechanism consisting of one or more cylinders 23ª mounted on the platform 3. These cylinders are provided with pistons 24ª of the usual form, to which are connected piston rods 24 (see Fig. 8). These piston rods are connected by the connecting pieces 25 and 25ª with the cables 18. The connecting piece 25 is connected with the cables and the connecting piece 25ª is preferably pivotally connected at 25ᵇ with the connecting piece 25. It will thus be seen that when the piston rods are moved into the cylinders the cables will be rotated so as to lift the tower, and when the piston rods are moved outwardly the cables will be rotated so as to lower the tower onto the frame 3, as shown in full lines in Fig. 2. The liquid used in these cylinders is preferably a non-congealing oil, although any suitable liquid may be used. This liquid is forced into the cylinders to secure the desired pressure, by means of a pump 26 operated by a motor 27, the pump and motor being mounted on the frame 3. The pressure of this liquid then acts on the pistons in the cylinders so as to move them to lift the tower. The tower is lowered by permitting the liquid to be discharged from the cylinders, the weight of the tower causing it to move back to the position shown in full lines in Fig. 2. The discharge of the liquid from the cylinders is controlled by the three-way valve 23ᶜ so that the tower may be held in any desired position by closing the valve. When the pistons in the cylinders 23 reach the limit of their movement they are stopped so as to hold the tower in its upright position. The motor may be an electric motor, securing its current through a connecting cable 28 wound upon a spring drum 29 on the truck frame 1, the current being supplied by a generator 30 mounted on the truck frame and run from the truck engine. By having the cable 28, it will be seen that the tower may be demounted from the truck and located at a distance from it and yet the generator on the truck used to operate the electrical appliances on the tower, such as the motor and the searchlight and a signaling apparatus such as a wireless telegraph or other telegraphic or telephonic apparatus.

Some suitable means may be provided for raising and lowering the tower by hand. As herein shown, this result is secured by means of a crank 31 connected with a shaft 32, said shaft being connected by suitable gears 33 with a drum 34 about which passes a cable 35. This cable runs about pulleys 36 and is connected with the cables 18 so as to move them when the crank is rotated. When the hand device is used the cylinders 23ª are aranged so that the pressure of the liquid therein will not interfere with the hand-controlled apparatus. The tower may be held in any desired position by the usual pawl and ratchet construction. Some means is provided for moving the two sections of the tower with relation to each other to extend or collapse the sections. In the construction shown there is provided a cylinder 37 similar to the cylinders 23ª, the cylinder being connected with the lower tower section 8 so as to move therewith. This cylinder has a piston therein, and a piston rod 38 projecting therefrom, the piston rod being connected with the section 9 of the tower by means of a cross-piece 39, the piston rod being connected with this cross-piece and the cross-piece being connected with the tower section. Liquid is forced into this cylinder 37 by the pump 26. It will be seen that when liquid is forced into the cylinder back of the piston, the piston and piston rod will be moved outwardly so as to move the outer section of the tower to its extended position. When the piston reaches the limit of its travel, the tower is in its fully extended position and is stopped in this position. Some means is provided for keeping the platform 12 in a horizontal position during all the various positions of the tower from its down position to its up position, and this means must be arranged so as to automatically adjust itself when the tower is lengthened and shortened by moving the two sections relatively. In the construction shown (see Figs. 6 and 7) this result is secured in the following manner: At each side of the tower I provide a cable 40. One end of this cable is fastened to the arm 15. This cable then passes around a pulley 41 mounted on a shaft 42 mounted on the lower section 8 of the tower. The cable then passes downwardly and then passes over a pulley 43 connected with the moving block 44. The cable then passes upwardly and is connected with the arm 14, the cable engaging the pulley 45. A second cable 46 is connected at 47 with the lower section 8 of the tower and then passes up over a pulley 47ª on the movable block 44, and then passes downwardly and about the pulley 48 mounted on the lower section of the tower. The pulley 48 and the connection 47 are preferably on the line connecting the centers of the two arms 15 on opposite sides of the tower. The cable 46 then passes over a pulley 49 connected with the lower section 8 of the tower, and is then attached at 50 to the upper section 9 of the tower.

It will be seen that by means of this construction when the upper section of the tower is moved upwardly, the blocks 44 move upwardly half of this distance and the cable 40 is lengthened half of this distance by the shortening of the distance between the blocks 44 and the pulleys 41, and that the reverse condition is true when the upper section is lowered. It will thus be seen that the platform 12 is thus maintained in its horizontal position and that the device automatically adjusts itself to the shortening and lengthening of the tower.

In Fig. 1 I have shown the tower and its frame mounted upon the truck 1, and have shown a second frame 51 acting as a trailer and connected by a suitable connecting piece 52 with the truck so as to be pulled along by the truck. This second frame 51 is provided with wheels 53, which are connected to folding legs or supports 54 provided with braces 55. This frame 51 may be mounted upon the truck like the frame 3 and the supports and braces folded for this purpose. This truck may contain a device 56 for sending and receiving messages, such as wireless or other telegraph or telephone apparatus. This apparatus is shown folded in full lines, and set up in dotted lines.

In addition to using a searchlight 16 with the observation tower, I may also provide a suitable gun 57. This gun is shown in position connected with the tower, in Fig. 1, and the lamp 16 is shown removed and placed on the second frame 51. It will thus be seen that either the gun or the searchlight may be used on the observation tower. The message sending and receiving apparatus may receive its current from any desired source, such for example, as the generator 30 on the truck 1. As shown in Fig. 8, the pump 26 is connected to the cylinders 23ª by the pipes 58 and 59. When the liquid is discharged from the cylinders to permit the tower to be lowered, it may be discharged into a tank 60, there being a three-way valve 23ᶜ which can be moved to connect either the tank or the pump with these cylinders. When it is again desired to raise the tower the liquid is pumped from the tank 60 by the pump 26 into the cylinders. The liquid is pumped into the cylinder 37 through the pipe 61 (see Fig. 6) which has a flexible joint 62 arranged to permit the movement of the tower about its axis without interfering with this connection. This flexible joint is located practically at the axis of rotation of the tower. This pipe is also controlled so as to hold the liquid in the cylinder in order to hold the upper section of the tower in its extended position. This control may be secured by the valve 63. When the observation tower is moved to its upright position it will be seen that the points 19 where the cables 18 are connected with the tower move so as to pull the cables outwardly, as shown in dotted lines in Fig. 2, and some means must be provided for compensating for this. In the construction shown, the pulleys 21 at each side are made movable. These pulleys are connected to the links 64 and 65, the link 64 being connected with the frame 3 and the link 65 being connected with the tower at the point 66. It will be seen that as the tower is lifted the points 66 move inwardly so as to move the two pulleys 21 inwardly to compensate for the outward movement of the cable as the tower rotates about its pivotal point. The frame 3 may be held in position on the truck by suitable hooks or latches 67. The supports 5 are held in position when the frame 3 is mounted on the truck by the arms 68, which preferably engage the wheels 6ª. The arms 68 are located on opposite sides of the truck (see Fig. 4) and are connected to a cross shaft 69 so that they may be moved simultaneously. This cross shaft is provided with the latches 70 which engage the spring holding devices 71, which hold them in their operative position, as shown in Fig. 4.

It will thus be seen that by means of this construction I provide a complete reconnoitering apparatus which can be quickly and easily moved from place to place and used at any desired point.

The use and operation of my invention are as follows:

When it is desired to use the entire apparatus, the observation tower is mounted upon the truck 1 and the second frame 51 connected with the truck 1 so as to act as a trailer and the apparatus then quickly moved to the point of use. The signal receiving and sending apparatus may then be erected and the tower raised. The tower may be either raised while on the truck and the tower and its frame demounted from the truck, as shown in Fig. 3. Observations may then be made and messages sent and received and the tower may be raised about its pivot any desired height and lengthened and shortened by moving the two sections relatively so as to raise the platform carrying the observer and the searchlight or gun to any desired height, and can be maintained at this height and observations taken. The gun may be used if desired. When it is desired to move to another point, the observation tower is loaded on the truck and the truck connected with the frame 51 and the apparatus thus easily and quickly transported to another point. When the tower is demounted, if the observers should be surprised by the enemy and there is not time to remount the tower, it can be dragged along behind as a trailer, and if higher speed is necessary to escape, it can be detached and the observers can escape in the truck, thus saving a part of the apparatus.

It will be noted that in this construction the platform is connected to the tower by a single set of pivots and that there is means associated with the tower for holding said platform in a horizontal position during all the positions of the tower.

I claim:

1. A military reconnoitering apparatus comprising a movable frame, an observation tower mounted thereon, a platform carried by said tower, means for lengthening and shortening said tower and for raising and lowering it, and a flexible adjusting means automatically adjusting itself as the tower is lengthened and shortened for holding the platform substantially horizontal in all positions of the tower.

2. A military reconnoitering apparatus comprising a frame, an observation tower rotatably mounted thereon, said tower having two relatively movable sections, means for moving said sections to lengthen and shorten said tower, a platform pivotally connected to the upper section of said tower, means for keeping said platform in a substantially horizontal position during all the various positions of the tower comprising a flexible cable extending between said platform and a fixed part at the bottom of the tower, and means for automatically lengthening and shortening the effective length of said cable when the tower is lengthened and shortened.

3. A military reconnoitering apparatus comprising a frame, an observation tower rotatably mounted thereon, said tower having two relatively movable sections, means for moving said sections to lengthen and shorten said tower, a platform pivotally connected to the upper section of said tower, means for keeping said platform in a substantially horizontal position during all the various positions of the tower comprising flexible cables connected with the platform and with a fixed part near the bottom of the tower, said cables having looped portions, a cable connected to the upper tower section and to a fixed part and also provided with a looped portion, said latter cable and the cable connected to the platform being movably connected together intermediate their ends, whereby a relative movement of the tower sections to lengthen and shorten the tower, automatically adjusts the cables connected to the platform to compensate for variation in length of said tower.

4. A military reconnoitering apparatus comprising a movable support mounted on wheels, a frame adapted to be slid on and off said movable support so as to be separated therefrom, an observation tower mounted on said frame, and means for raising and lowering said tower both when the frame is on and off said movable support.

5. A military reconnoitering apparatus comprising a frame, an observation tower pivotally mounted thereon, said tower comprising two relatively movable sections, means for moving said sections relatively to lengthen or shorten the tower, a platform pivotally connected to the upper end of said tower by a single set of pivots, and a flexible automatically adjustable cable connected with said platform and said frame which holds said platform in a horizontal position during all the various positions of the tower.

In testimony whereof, I affix my signature in the presence of two witnesses this 16th day of October, 1915.

JOSEPH B. STRAUSS.

Witnesses:
 CHRISTINA DEANS,
 ELLA THIEME.